United States Patent
Kim

Patent Number: 5,463,301
Date of Patent: Oct. 31, 1995

[54] VECTOR CONTROLLING METHOD AND APPARATUS FOR INDUCTION MOTOR

[75] Inventor: Jung G. Kim, Seoul, Rep. of Korea

[73] Assignee: Samsung Aerospace Industries, Ltd., Kyongangnam, Rep. of Korea

[21] Appl. No.: 332,269

[22] Filed: Oct. 31, 1994

[30] Foreign Application Priority Data

Nov. 12, 1993 [KR] Rep. of Korea .................. 1993-24055

[51] Int. Cl.$^6$ ...................................................... H02P 5/40
[52] U.S. Cl. .......................... 318/801; 318/804; 318/807
[58] Field of Search ..................................... 318/767, 798, 318/799, 800, 801, 802, 803, 804, 805, 806, 807, 808, 809, 812

[56] References Cited

U.S. PATENT DOCUMENTS

| | | | |
|---|---|---|---|
| 4,503,376 | 3/1985 | Okuyama | 318/802 |
| 4,509,003 | 4/1985 | Ohnishi et al. | 318/800 |
| 4,680,525 | 7/1987 | Kobari et al. | 318/798 |
| 4,707,651 | 11/1987 | Schauder | 318/800 |
| 4,757,248 | 7/1988 | Fujioka et al. | 318/807 |

*Primary Examiner*—Bentsu Ro
*Attorney, Agent, or Firm*—Morgan & Finnegan

[57] ABSTRACT

A vector controlling method and apparatus for an induction motor is disclosed in which a rotator magnetic flux is reliably obtained by using a newly deduced equation. The apparatus includes a rotator magnetic calculator and does not require a tachogenerator so that the rotator magnetic flux can be obtained by calculation.

8 Claims, 3 Drawing Sheets

VECTOR CONTROLLING METHOD AND APPARATUS FOR INDUCTION MOTOR

BACKGROUND OF THE INVENTION

The present invention relates to a vector controlling method and apparatus for an induction motor, and more particularly, to a vector controlling method and apparatus for an induction motor which does not require a speed detector.

An induction motor is most widely used as a power source for various mechanisms and apparatuses in industrial fields. This is because the induction motor has peculiar advantages in that it has a simple structure, needs little maintenance and exhibits excellent durability and low production costs.

The induction motor is, however, very difficult to control because the dynamic characteristic thereof is clearly non-linear, with many interactive variables present. Much investigation into techniques of controlling the induction motor for high performance has been widely carried out. In the 1980s, with the advent of the rapid development of semiconductors, complicated control theories were applied to actual systems to further advance induction motor control techniques. Especially, the vector control method developed in the early 1970s provided for the characteristics of the induction motor to be divided into a magnetic flux component and a torque component, so that the induction motor could be controlled with the high performance of a direct-current motor, which greatly broadened the scope of application of induction motors. However, the vector controlling method needs data on the angular velocity of a rotator and therefore requires a speed detector such as a tachogenerator and encoder. This complicates a system, deteriorates the durability and reliability of the induction motor, destabilizes the system, and increases production cost.

A method of detecting the magnetic flux of a rotator has been proposed by Ohtani in a paper entitled "Vector Control of Induction Motor without Shaft Encoder" (*IEEE Transactions on Industry Application*, Vol. 28, No. 1, January/February, 1992). This method will be explained below.

Provided that the d axis of the d-q coordinates rotating at the angular velocity (electrical angular velocity $\omega$) of induction motor coincides with the magnetic flux vector of the rotator, the relationship between the magnetic flux $\phi_r$ of rotator, generated torque $T_e$ and the angular velocity $\omega_r$ of induction motor can be expressed as follows.

$$\phi_r = \frac{M \times I_{d1}}{1 + T_2 P} \quad (1.1)$$

$$\omega_r = \omega - \frac{M}{L_2}\left(\frac{R_2 I_{q1}}{\phi_r}\right) \quad (2.1)$$

$$T_e = \phi_r I_{q1}\left(\frac{-M}{L_2}\right) \quad (3.1)$$

where M is mutual inductance; $I_{d1}$ is the d-axis component (magnetic flux component) of the primary-side (stator) current; $I_{q1}$ is the q-axis component (torque component) of the primary-side (stator) current; $T_2$ is a time constant ($L_2/R_2$) of the secondary-side (rotator); $L_2$ is rotator inductance; $R_2$ is rotator resistance; and P is an operator (d/dr) for differentiation.

In other words, the generated torque $T_e$ and angular velocity $\omega_r$ of an induction motor are determined by magnetic flux vector $\phi_r$ of the rotator and primary-side currents $I_{d1}$ and $I_{q1}$. The generated torque and torque-component current, i.e., the main control variables, can be given as the following equations (4.1) and (5.1) on the orthogonal coordinates ($\alpha$-$\beta$) fixed coordinates or x-y fixed coordinates) of the stator.

$$I_{q1} = -[i_\beta \cos(\omega t + \rho) - i_\alpha \sin(\omega t + \rho)] \quad (4.1)$$
$$= -\left[\frac{i_\beta \phi_\alpha}{(\phi_\alpha^2 + \phi_\beta^2)^{1/2}} - \frac{i_\alpha \phi_\beta}{(\phi_\alpha^2 + \phi_\beta^2)^{1/2}}\right]$$
$$= \frac{-(\phi_\alpha i_\beta - \phi_\beta i_\alpha)}{\phi_r}$$

$$T_e = \phi_r I_{q1}\left(\frac{-M}{L_2}\right) \quad (5.1)$$
$$= \frac{-M}{L_2} \times (\phi_\alpha i_\beta - \phi_\beta i_\alpha)$$

where $\phi_\alpha = \phi_r \cos(\omega t + \rho)$; $\phi_\beta = \phi_r \sin(\omega t + \rho)$; $i_\alpha = I_1 \cos(\omega t + \gamma^* + \rho)$; and $i_\beta = I_1 \sin(\omega t + \gamma^* + \rho)$.

Assuming that $\rho$ is the angle of the d axis with respect to the $\alpha$ axis when t=0 (and may be given as zero), then $\gamma^*$ and $I_1$ can be expressed as follows.

$$\gamma^* = \tan^{-1}(I_{q1}/I_{d1})$$

$$I_1 = (I_{d1}^2 + I_{q1}^2)^{1/2}$$

The calculation equation for the rotator magnetic flux, used by Ohtani, is as follows.

$$\phi_\alpha = \int_0^\infty (V_\alpha - R_1 i_\alpha)dt - L_{rl\alpha} \quad (6.1)$$

$$\phi_\beta = \int_0^\infty (V_\beta - R_1 i_\beta)dt - L_{rl\beta} \quad (7.1)$$

where $V_\alpha$ and $V_\beta$ are stator voltages on $\alpha$ and $\beta$; $i_\alpha$ and $i_\beta$ are stator currents on $\alpha$ and $\beta$; $R_1$ is the primary-side stator resistance; $L_{rl\alpha}$ and $L_{rl\beta}$ are the total leakage inductance on $\alpha$ and $\beta$ or $L_1(1-M^2/L_1 L_2)$; and $L_1$ is the primary-side stator reactance.

FIG. 1 is a block diagram of the rotator magnetic flux calculator proposed by Ohtani.

Referring to FIG. 1, the calculator comprises a current-controlled inverter 1, an induction motor 2, a subtractor 3, a multiplier 4 having the variable value of $R_1+L_{rl}P$, an integration circuit 5 having the characteristic value of $$\frac{T_L}{1+T_{LP}},$$

an integration circuit 7 having the characteristic value of $$\frac{1}{1+T_{LP}},$$

and an adder 6.

A rotator induction voltage e is applied to integration circuit 5, and the magnetic flux command $\phi^*$ of rotator is applied to integration circuit 7. The outputs of integration circuits 5 and 7 are summed to detect the rotator magnetic flux.

The output e of subtractor 3 is expressed as the following equation (8.1).

$$e = V_1 + (R_1 + l_p)i_1 \quad (8.1)$$

where $V_1 = V_\alpha + jV_\beta$ and $i_1 = i_\alpha + ji_\beta$.

Therefore, equations (6.1) and (7.1) are expressed as the following equation (9.1).

$$\underline{\phi} = \underline{e}\left(\frac{T_L}{1+T_L P}\right) + \underline{\phi}^*\left(\frac{1}{1+T_L P}\right) \quad (9.1)$$

where $\phi^* = \phi_\alpha + j\phi_\beta$.

As shown in equations (6.1) and (7.1), Ohtani's method of calculating the magnetic flux of rotator requires integration. In implementing the method, if a pure integrator is used and a direct-current offset or drift is present in the input value, the calculated value of the magnetic flux diverges and is rather unreliable. For this reason, Ohtani instead used a lag $$\dot{\phi}_r = -a_4\phi_r + a_5\left(\frac{a_2\alpha_x\phi_r - sgn(\omega_r)\alpha_y\sqrt{\alpha_x^2 + \alpha_y^2 - |a_2\phi_r|^2}}{\alpha_x^2 + \alpha_y^2}\right)i_{xs} +$$

$$a_5\left(\frac{a_2\alpha_y\phi_r - sgn(\omega_r)\alpha_x\sqrt{\alpha_x^2 + \alpha_y^2 - |a_2\phi_r|^2}}{\alpha_x^2 + \alpha_y^2}\right)$$

$$= -\left(a_4 + \frac{a_2 a_5(\alpha_x i_{xs} + \alpha_y i_{ys})}{\alpha_x^2 + \alpha_y^2}\right)\phi_r + sgn(\omega_r)\left(\frac{\alpha_x i_{ys} - \alpha_y i_{xa}}{\alpha_x^2 + \alpha_y^2}\right)\sqrt{\alpha_x^2 + \alpha_y^2 - |a_2\phi_r|^2}$$

circuit similar to the integrator. In low-speed operation, however, the calculation value of the lag circuit is considerably different from the actual value and interferes with the rotator speed so that a complete vector control is impossible. In Ohtani's method, the problem was solved by inhibiting the control of magnetic flux at low speeds. This solution is imperfect for enabling a proper vector control throughout the speed ranges.

Further, the Ohtani method needs additional external hardware such as an accelerator for initially driving the motor, because the calculated value of the rotator magnetic flux is unstable in initial driving.

SUMMARY OF THE INVENTION

Therefore, it is an object of the present invention to provide a vector controlling method for an induction motor enabling a high-performance dynamic response characteristic by calculating the magnetic flux and angular velocity of the rotator by using stator voltage and current information, without a speed detector, and applying the calculated information to the non-interference control of the induction motor.

It is another object of the present invention to provide a vector controlling method for an induction motor which does not require external driving initially.

It is still another object of the present invention to provide a vector controlling circuit for an induction motor which is capable of detecting a reliable magnetic flux for the rotator.

To accomplish the first object, there is provided a vector controlling method for an induction motor having a rotator and stator, comprising the steps of:

calculating voltages and currents $i_{xs}$, $i_{ys}$, $V_{xs}$ and $V_{ys}$ for the stator;

calculating variables $\alpha_x$ and $\alpha_y$ by using the equations $$\alpha_x = \dot{i}_{xs} + a_1 i_{xs} - a_0 V_{xs}$$

$$\alpha_y = \dot{i}_{ys} + a_1 i_{ys} - a_0 V_{ys}$$

estimating $\phi_{xr}$ and $\phi_{yr}$ by using the equations $$\cos\theta_r = \frac{a_2\alpha_x\phi_r - sgn(\omega_r)\alpha_y\sqrt{\alpha_x^2 + \alpha_y^2 - |a_2\phi_r|^2}}{\alpha_x^2 + \alpha_y^2}$$

$$\sin\theta_r = \frac{a_2\alpha_y\phi_r - sgn(\omega_r)\alpha_x\sqrt{\alpha_x^2 + \alpha_y^2 - |a_2\phi_r|^2}}{\alpha_x^2 + \alpha_y^2}$$

and $$\phi_{xr}\dot{\phi}_{xr} + \phi_{yr}\dot{\phi}_{yr} = -a_4(\phi_{xr}^2 + \phi_{yr}^2) + a_5(\phi_{xr}i_{xs} + \phi_{yr}i_{ys});$$

updating $\phi_r$ by using the equation calculating the angular velocity of the rotator according to the equation $$P\omega_r = \alpha_x \frac{a_2\alpha_y\phi_r + sgn(\omega_r)\alpha_x\sqrt{\alpha_x^2 + \alpha_y^2 - |a_2\phi_r|}}{a_3\phi_r(\alpha_x^2 + \alpha_y^2)} -$$

$$\alpha_y \frac{a_2\alpha_x\phi_r + sgn(\omega_r)\alpha_x\sqrt{\alpha_x^2 + \alpha_y^2 - |a_2\phi_r|}}{a_3\phi_r(\alpha_x^2 + \alpha_y^2)}$$

$$= sgn(\omega_r)\frac{1}{a_3\phi_r}\sqrt{\alpha_x^2 + \alpha_y^2 - |a_2\phi_r|^2}$$

where P indicates a value of the number of phase divided by two;

calculating control inputs $u_1$ and $u_2$ by using the equations $$u_1 = -k_{P1}\omega_r + k_{i1}\int_0^t (\omega_r^* - \omega_r)d\tau$$

and $$u_2 = -k_{P2}\phi_r + k_{i2}\int_0^t (\phi_r^* - \phi_r)d\tau$$

where $k_{pj}$ and $k_{ij}$ (for j=1, 2) are control gain values for the controller, and $\omega_r^*$ and $\phi_r^*$ are command inputs of $\omega_r$ and $\phi_r$; and substituting the values obtained in the preceding step into the equation $$\begin{bmatrix} i_{xs}^* \\ i_{ys}^* \end{bmatrix} = \begin{bmatrix} -\sin\theta_r & \cos\theta_r \\ \cos\theta_r & \sin\theta_r \end{bmatrix} \begin{bmatrix} 1/\phi_r & 0 \\ 0 & 1 \end{bmatrix} \begin{bmatrix} u_1 \\ u_2 \end{bmatrix}$$

and thereby obtaining current commands $i_{xs}$ and $i_{yr}$.

To accomplish the second object of the present invention, there is provided a vector controller for an induction motor having a rotator and stator, comprising:

rectifying means for obtaining a direct-current voltage from an alternate voltage;

speed controlling means for performing a control operation with a user's speed command $\omega_r^*$ and a speed feedback estimated value $\hat{\omega}_r$, thereby outputting a control output value $u_1$;

magnetic flux controlling means for performing a control operation with a user's magnetic flux command $\phi_r^*$ and a magnetic flux feedback estimated value $\hat{\phi}_r$, thereby outputting a control output value $u_2$;

non-interference controlling means for converting a nonlinear interference system into a linear non-interference system, by forming a nonlinear feedback and outputting stator current commands $i_{xs}^*$ and $i_{ys}^*$ on stator fixed coordinates;

current controlling means for performing a proportional integration control with the current commands $i_{xs}^*$ and $i_{ys}^*$ and actual feedback currents $i_{xs}$ and $i_{ys}$ flowing through the induction motor, and converting the result into a voltage signal;

first phase converting means for converting a two-phase voltage of the current controlling means into a three-phase voltage signal;

switching means for driving the induction motor in response to the three-phase voltage signal output from the first phase converting means;

second phase converting means for converting a three-phase current signal from the induction motor into a two-phase current signal; and calculating means for receiving the output signals of the current controlling means and the second phase converting means and calculating a rotator speed and rotator magnetic flux value for the induction motor control.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
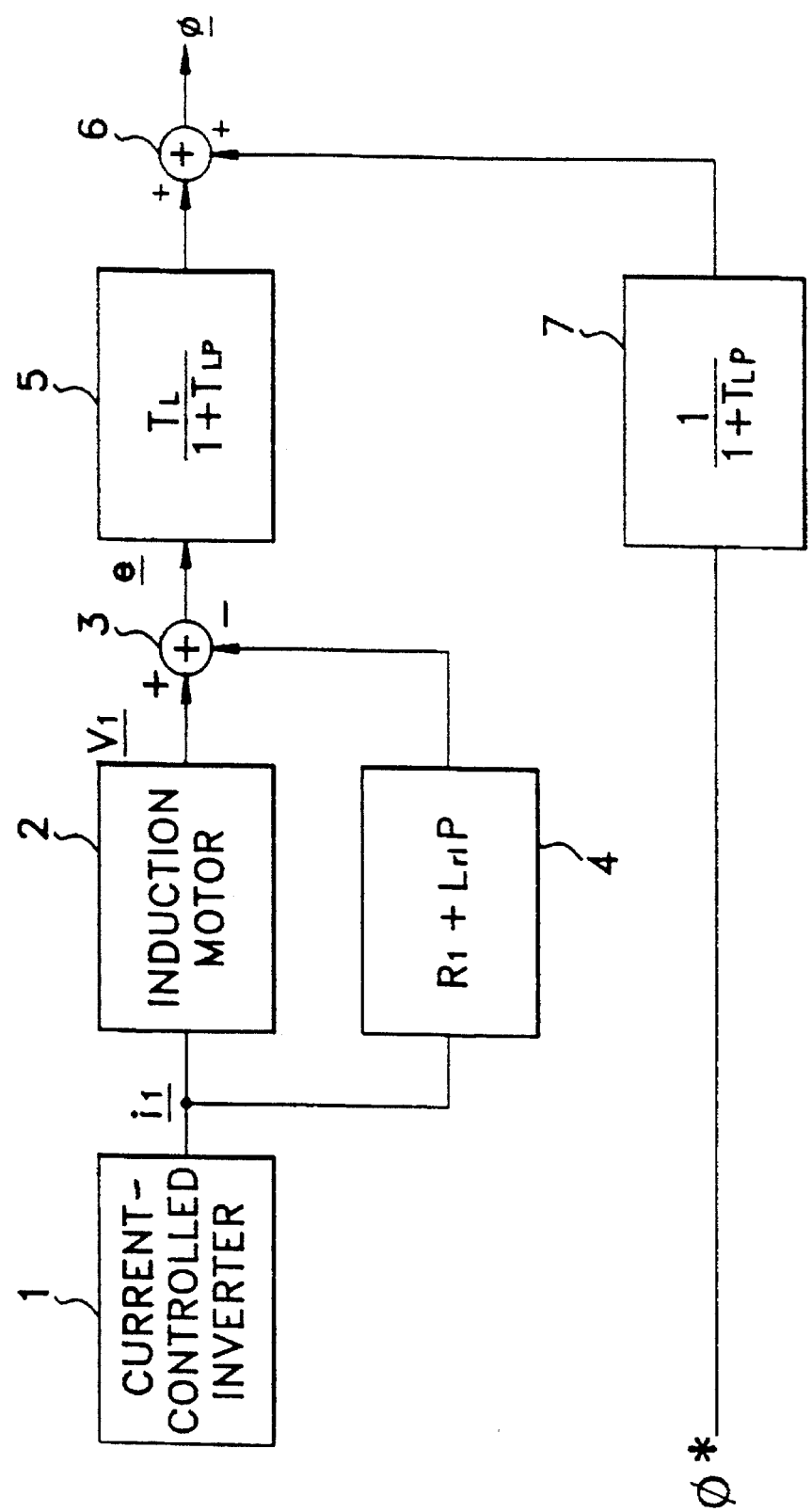
FIG. 1 is a block diagram of a conventional rotator magnetic flux calculating circuit for an induction motor requiring no speed detector.
Figure 2:
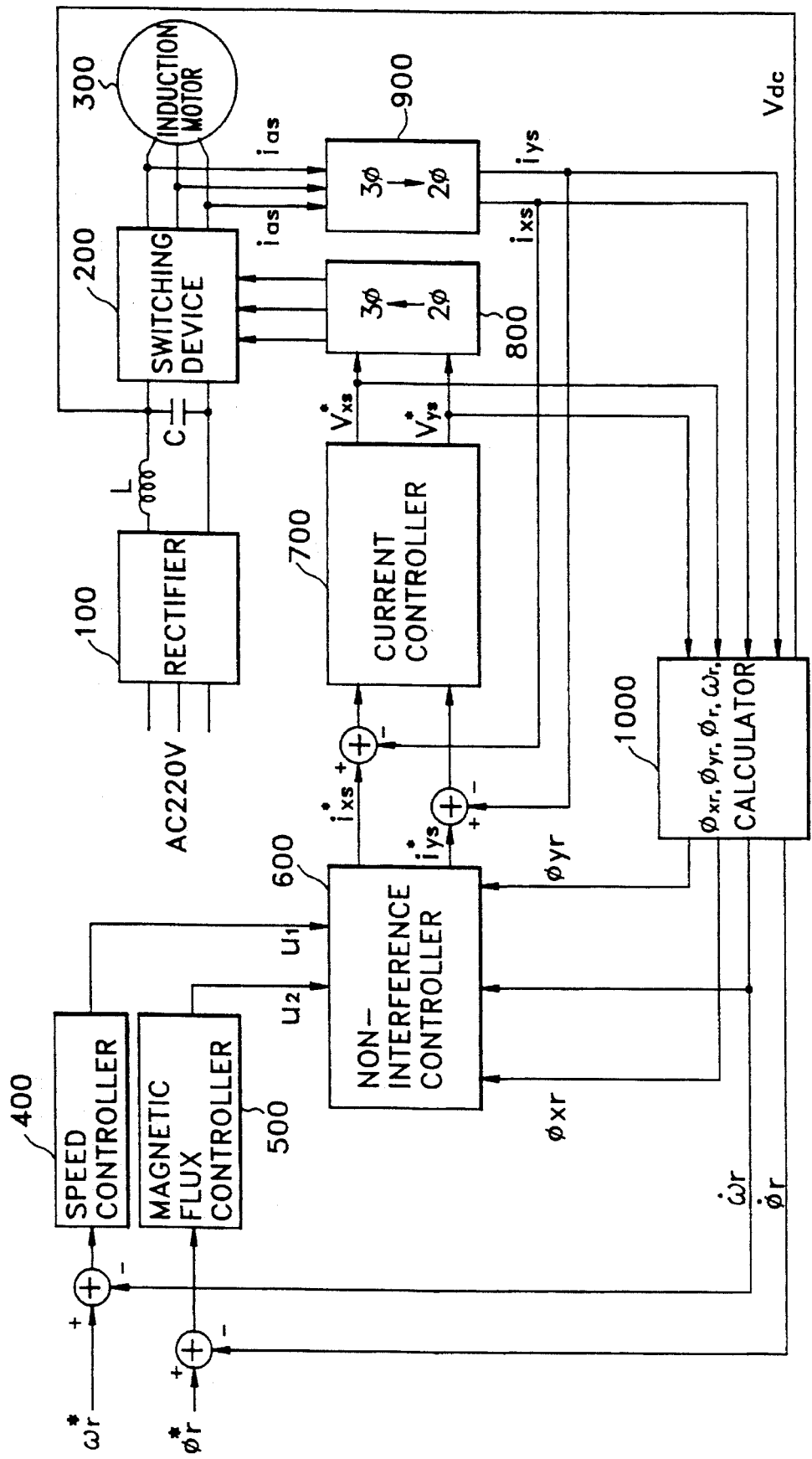
FIG. 2 is a block diagram of a vector controlling circuit for an induction motor requiring no speed detector, according to the present invention.

Referring to FIG. 2, a vector controlling circuit for an induction motor 300 comprises a rectifier 100, a switching device 200, a speed controller 400, a magnetic flux controller 500, a noninterference controller 600, a current controller 700, a converter 800 for converting two phases into three phases, a converter 900 for converting three phases into two phases, and a state variable calculator 1000.

The functions of the respective components will be explained below.

The rectifier 100, to which a reactance L and a capacitor C are additionally connected, is designed to reduce a direct-current ripple voltage. Speed controller 400 performs a control with a user's speed command $\omega_r^*$ and a speed feedback estimated value $\hat{\omega}_r$, thereby outputting a control output $u_1$. Magnetic flux controller 500 performs a control with a user's magnetic flux command $\phi_r^*$ and a magnetic flux feedback estimated value $\hat{\phi}_r$, thereby outputting a control output $u_2$. Noninterference controller 600 formed in a nonlinear feedback converts the induction motor, a nonlinear interference system, into a linear noninterference system. Here, the induction motor is divided into an electromagnetic system and a mechanical system. The final output thereof is a stator current command $(i_{xs}^*, i_{ys}^*)$ on the stator fixed coordinates Current controller 700 performs a proportional integration control with the current command $(i_{xs}^*, i_{ys}^*)$ and an actual feedback current $(i_{xs}, i_{ys})$ flowing through the induction motor. The output of the proportional integration control is compared with a trigonometric wave and becomes a voltage-modulated signal through a pulse-width modulation. Switching device 200 outputs a tri-phase voltage modulating signal for driving the induction motor through the switching operation. Phase converter 800 converts the voltage-modulated signal on the x-y coordinates into a tri-phase coordinates signal and drives the gate of switching device 200. Current controller 700 and phase converter 900 detect the actual current flowing through the induction motor via a current sensor and convert the tri-phase current signal into the signal on the x-y coordinates for easy control. State variable calculator 1000 calculates the rotator magnetic flux and rotator speed which are internal variables necessary for the induction motor control, with the input variable and output variable of the induction motor.

Figure 3:
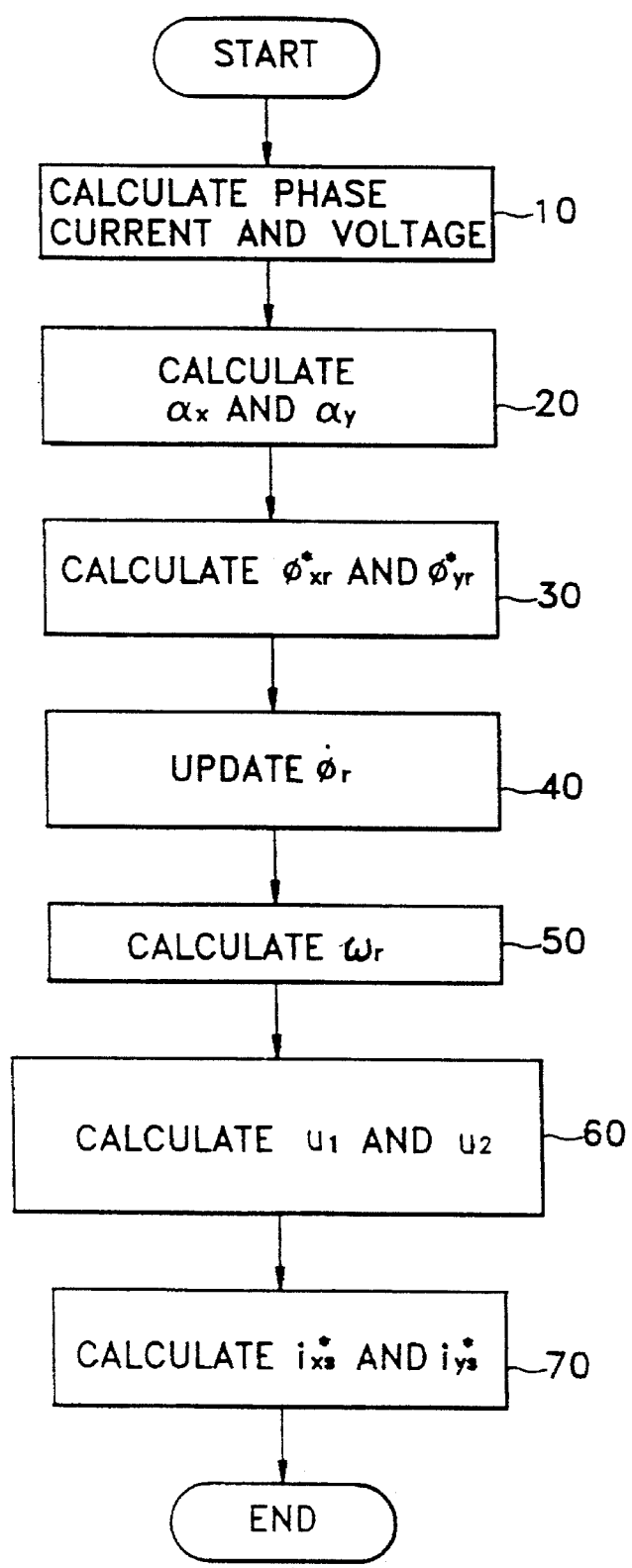
FIG. 3 is a flowchart illustrating a vector controlling method for an induction motor requiring no speed detector, according to the present invention.

Referring to FIG. 3, the stator voltage and current are calculated in step 10.

The dynamic equation of the induction motor taking the stator fixed coordinates (hereinafter referred to as the x-y coordinates) as a reference axis is given as follows:

$$\dot{i}_{xs} = -a_1 i_{xs} + a_2 \phi_{xr} + a_3 P \omega_r \phi_{yr} + a_0 V_{xs} \tag{1}$$

$$\dot{i}_{ys} = -a_1 i_{ys} + a_2 \phi_{yr} - a_3 P \omega_r \phi_{xr} + a_0 V_{ys} \tag{2}$$

$$\dot{\phi}_{xr} = -a_4 \phi_{xr} - \phi \omega_r \phi_{yr} + a_5 i_{xs} \tag{3}$$

$$\dot{\phi}_{yr} = -a_4 \phi_{yr} + \phi \omega_r \phi_{xr} + a_5 i_{ys} \tag{4}$$

$$\dot{\omega}_r = -a_6 \omega_r + a_7 (T_e - T_L) \tag{5}$$

where $i_{xs}$ is the x-axis current of the stator; $i_{ys}$ is the y-axis current of the stator; $\phi_{xr}$ is the x-axis magnetic flux value of the rotator; $\phi_{yr}$ is the y-axis magnetic flux value of the rotator; $\phi_r$ is the angular velocity of the rotator; $T_e$ is generated torque; and $T_L$ is load torque.

Here, $V_{xs}$ (the x-axis voltage of the stator) and $V_{ys}$ (the y-axis voltage of the stator) are control inputs. Torque $T_e$ is given as in the following equation (6).

$$T_e = K_T (\phi_{xr} i_{ys} \phi_{yr} i_{xs}) \tag{6}$$

Given that various induction motor constants and rotation direction are known in the deriving process of the estimating equation of the magnetic flux and rotation speed for rotator, magnetic fluxes $\phi_{xr}$ and $\phi_{yr}$ for x-y axis rotator can be expressed with the magnitude $\phi_r$ of the rotator magnetic flux and position angle $\theta_r$ of the rotator magnetic flux, as shown in the following equations (7a) and (7b).

$$\phi_{xr} = \phi_r \cos\theta_r \tag{7a}$$

$$\phi_{yr} = \phi_r \sin\theta_r \tag{7b}$$

Instead of directly deriving rotator magnetic flux information $\phi_{xr}$ and $\phi_{yr}$ necessary for control, the values of $\cos\theta_r$, $\sin\theta_r$ and $\phi_r$ are estimated.

In step 20, which is a characteristic feature of the present invention, $\alpha_x$ and $\alpha_y$ are calculated by using the following equations (8) and (9).

$$\alpha_x = i'_{xs} + a_1 i_{xs} - a_0 V_{xs} \quad (8)$$

$$\alpha_y = i'_{ys} + a_1 i_{ys} - a_0 V_{ys} \quad (9)$$

Here, $\alpha_x$ and $\alpha_y$ are rotator variables and can be calculated through the estimation of rotator current and voltage.

First, equations (1) and (2) are multiplied by $\phi_{xr}$ and $\phi_{yr}$, respectively, and then summed to become the following equation (10).

$$\phi_{xr}(i'_{xs} + a i_{xs} - a_0 V_{xs}) + \phi_{yr}(i'_{ys} + a_1 i_{ys} - a_0 V_{ys}) = a_0(\phi_{xr}^2 + \phi_{yr}^2) \quad (10)$$

When equations (7), (8) and (9) are substituted for equation (10) and both sides are divided by $\phi_r$ (assuming of course that $\phi_r \neq 0$), a nonlinear algebraical expression such as the following equation (11) is derived.

$$\alpha_x \cos\theta_r + \alpha_y \sin\theta_r = a_2 \phi_r \quad (11)$$

Using equation (11), $\theta_r$ can be expressed as a function of $\alpha_x$, $\alpha_y$ and $\phi_r$. If the above equation is considered to be a nonlinear equation with respect to $\theta_r$ and a solution of $\theta_r$ is to be obtained therefrom, two solutions are produced. One of the two roots is an unrelated one which is generated when a term relative to $\omega_r$ is removed from equations (1) and (2) to form one equation. Therefore, the root does not coincide with the actual value of $\theta_r$.

When equation (11) is solved by additionally using the rotational direction of the induction motor in order to discriminate a single appropriate root, $\cos\theta_r$ and $\sin\theta_r$ are calculated as follows.

Step 30 is designed to estimate $\phi'_{xr}$ and $\phi'_{yr}$ according to equations (12), (13) and (14).

$$\cos\theta_r = \frac{a_2 \alpha_x \phi_r - sgn(\omega_r) \alpha_y \sqrt{\alpha_x^2 + \alpha_y^2 - |a_2 \phi_r|^2}}{\alpha_x^2 + \alpha_y^2} \quad (12)$$

$$\sin\theta_r = \frac{a_2 \alpha_y \phi_r - sgn(\omega_r) \alpha_x \sqrt{\alpha_x^2 + \alpha_y^2 - |a_2 \phi_r|^2}}{\alpha_x^2 + \alpha_y^2} \quad (13)$$

Now, in order to derive the estimated equation of $\phi_r$, equations (3) and (4) are multiplied by $\phi_{xr}$ and $\phi_{yr}$, respectively, and summed to obtain the following equation (14).

$$\phi^{19}_{xr} \phi_{xr} + \phi'_{yr} \phi_{yr} = -a_4(\phi_{xr}^2 + \phi_{yr}^2) + a_5(\phi_{xr} i_{xs} + \phi_{yr} i_{ys}) \quad (14)$$

If both sides of the above equation are divided by $\phi_r$, the left side becomes equal to $\phi_r$, and therefore equation (14) can be modified into equation (15) as follows.

$$\phi'_r = -a_4 \phi_r + a_5 (\cos\theta_r i_{xs} + \sin\theta_r i_{ys}) \quad (5)$$

If equations (12) and (13) are substituted for equation (15), the following dynamic equation is obtained.

In step 40, $\phi'_r$ is updated from the following equation (16).

Equations (12), (13) and (16) are estimated equations for the rotator magnetic flux without using speed information.

An estimated equation for rotation speed is derived as follows.

Equations (1) and (2) are multiplied by $\phi_{yr}$ and $\phi_{xr}$, respectively, and equation (2) multiplied by $\phi_{yr}$ is subtracted from equation (1) multiplied by $\phi_{xr}$ to obtain the following equation (17).

$$\phi_{yr}(i'_{xs} + a_1 i_{xs} - a_0 V_{xs}) - \phi_{xr}(i'_{ys} + a_1 i_{ys} - a_0 V_{ys}) = a_3 P\omega_r(\phi_{xr}^2 + \phi_{yr}^2) \quad (17)$$

Equations (8) and (9) are substituted for equation (17) and rearranged with respect to $P\omega_r$ to obtain equation (18).

$$P\omega_r = \frac{\alpha_x \sin\theta_r - \alpha_y \cos\theta_r}{a_3 \phi_r} \quad (18)$$

If equations (12) and (13) are substituted for equation (18), the following calculation equation for the rotation speed will be obtained.

In step 50, the rotator angular velocity is calculated according to the following equation (19).

$$P\omega_r = \alpha_x \frac{a_2 \alpha_y \phi_r + sgn(\omega_r) \alpha_x \sqrt{\alpha_x^2 + \alpha_y^2 - |a_2 \phi_r|^2}}{a_3 \phi_r (\alpha_x^2 + \alpha_y^2)} - \alpha_y \frac{a_2 \alpha_x \phi_r + sgn(\omega_r) \alpha_x \sqrt{\alpha_x^2 + \alpha_y^2 - |a_2 \phi_r|^2}}{a_3 \phi_r (\alpha_x^2 + \alpha_y^2)}$$

$$= sgn(\omega_r) \frac{1}{a_3 \phi_r} \sqrt{\alpha_x^2 + \alpha_y^2 - |a_2 \phi_r|^2} \quad (19)$$

In the above equation (19), P indicates a value in which the number of phase is divided by two.

From here on, an indirect vector control based upon of the rotator magnetic flux and rotator speed expressed by equations (12), (13), (16) and (19) will be described below.

Suppose that stator currents $i_{xs}$ and $i_{ys}$ are directly controlled and approximate current commands $i_{xs}^*$ and $i_{ys}^*$ (in other words, $i_{xs} \approx i_{xs}^*$ and $i_{ys} \approx i_{ys}^*$), equations (1) to (5) are simplified as follows.

$$\phi'_{xr} = -a_4 \phi_{xr} - P\omega_r \phi_{yr} + a_5 i_{xs}^* \quad (20)$$

$$\phi'_{yr} = -a_4 \phi_{yr} - P\omega_r \phi_{xr} + a_5 i_{ys}^* \quad (21)$$

$$\omega'_r = -a_6 \omega_r + a_7 [k_T(-\phi_{yr} i_{xs}^* + \phi_{xr} i_{ys}^*) - T_L] \quad (22)$$

In the simplified system, if $\phi \neq 0$, a condition for noninterference is satisfied.

For the noninterference of the system, a nonlinear feedback such as the following equation (23) is applied.

$$\phi'_r = -a_4 \phi_r + a_5 \left( \frac{a_2 \alpha_x \phi_r - sgn(\omega_r) \alpha_y \sqrt{\alpha_x^2 + \alpha_y^2 - |a_2 \phi_r|^2}}{\alpha_x^2 + \alpha_y^2} \right) i_{xs} +$$

$$a_5 \left( \frac{a_2 \alpha_y \phi_r + sgn(\omega_r) \alpha_x \sqrt{\alpha_x^2 + \alpha_y^2 - |a_2 \phi_r|^2}}{\alpha_x^2 + \alpha_y^2} \right)$$

$$= -\left( a_4 + \frac{a_2 a_5 (\alpha_x i_{xs} + \alpha_y i_{ys})}{\alpha_x^2 + \alpha_y^2} \right) \phi_r + sgn(\omega_r) \left( \frac{\alpha_x i_{ys} - \alpha_y i_{xa}}{\alpha_x^2 + \alpha_y^2} \right) \sqrt{\alpha_x^2 + \alpha_y^2 - |a_2 \phi_r|^2} \quad (16)$$

$$\begin{bmatrix} i_{xs}^* \\ i_{ys}^* \end{bmatrix} = \begin{bmatrix} -\sin\theta_r & \cos\theta_r \\ \cos\theta_r & \sin\theta_r \end{bmatrix} \begin{bmatrix} 1/\phi_r & 0 \\ 0 & 1 \end{bmatrix} \begin{bmatrix} u_1 \\ u_2 \end{bmatrix} \quad (23)$$

where $u_1$ and $u_2$ are new inputs. According to the above equation, the input/output dynamic characteristic of the whole system derived from the following equations (24) and (25) is linear and noninterfering.

$$\omega_r = -a_6\omega_r + a_7(k_T u_1 - T_L) \quad (24)$$

$$\omega_r = -a_4\phi_r + a_5 u_2 \quad (25)$$

In order to obtain an intended transient response and a normal-state response, control inputs $u_1$ and $u_2$ of noninterference controller 600 are set as the outputs of speed controller 400 and magnetic flux controller 500 as described below.

In step 60, control inputs $u_1$ and $u_2$ are calculated by using the following equations (26) and (27).

$$u_1 = -k_{P1}\omega_r + k_{i1} \int_0^t (\omega_r^* - \omega_r) d\tau \quad (26)$$

$$u_2 = -k_{P2}\phi_r + k_{i2} \int_0^t (\phi_r^* - \phi_r) d\tau \quad (27)$$

$$\phi_r = -a_4\phi_r + a_5 \left( \frac{a_2\alpha_x\phi_r - sgn(\omega_r)\alpha_y \sqrt{\alpha_x^2 + \alpha_y^2 - la_2\phi_r|^2}}{\alpha_x^2 + \alpha_y^2} \right) i_{xs} +$$

$$a_5 \left( \frac{a_2\alpha_y\phi_r + sgn(\omega_r)\alpha_x \sqrt{\alpha_x^2 + \alpha_y^2 - la_2\phi_r|^2}}{\alpha_x^2 + \alpha_y^2} \right)$$

$$= -\left( a_4 + \frac{a_2 a_5(\alpha_x i_{xs} + \alpha_y i_{ys})}{\alpha_x^2 + \alpha_y^2} \right) \phi_r + sgn(\omega_r) \left( \frac{\alpha_x i_{ys} - \alpha_y i_{xa}}{\alpha_x^2 + \alpha_y^2} \right) \sqrt{\alpha_x^2 + \alpha_y^2 - la_2\phi_r|^2}$$

where $k_{pj}$ and $k_{ij}$ (for j=1,2) are control gain values for the controller, and $\omega_r^*$ and $\phi_r^*$ are command inputs of $\omega_r$ and $\phi_r$.

In step 70, current commands $i_{xs}$ and $i_{ys}$ are calculated by substituting the value obtained in step 60 in equation 23.

In step 80, the rotator magnetic flux is calculated by using equations (20) and (21).

According to the above method, rotator time constants for an induction motor are determined.

Accordingly, the vector controlling method and apparatus for an induction motor of the present invention is advantageous in that, first, a rotator speed can be precisely detected without a speed detector; second, there is no need for an external driving means for initially driving the induction motor; and third, the apparatus can operate with precision at low as well as high speeds.

What is claimed is:

1. A vector controlling method for an induction motor having a rotator and stator, comprising the steps of:

measuring an actual current flowing through said induction motor;

calculating actual feedback currents and voltages $i_{xs}$, $i_{ys}$, $V_{xs}$ and $V_{ys}$ for said stator based upon said actual current measured;

calculating variables $\alpha_x$ and $\alpha_y$ by using the equations $$\alpha_x = i_{xs} + a_1 i_{xs} - a_0 V_{xs}$$

$$\alpha_y = i_{ys} + a_1 i_{ys} - a_0 V_{ys}$$

estimating the magnetic flux $\phi_{xr}$ and $\phi_{yr}$ of said rotator by using the equations $$\cos\theta_r = \frac{a_2\alpha_x\phi_r - sgn(\omega_r)\alpha_y \sqrt{\alpha_x^2 + \alpha_y^2 - la_2\phi_r|^2}}{\alpha_x^2 + \alpha_y^2}$$

$$\sin\theta_r = \frac{a_2\alpha_y\phi_r - sgn(\omega_r)\alpha_x \sqrt{\alpha_x^2 + \alpha_y^2 - la_2\phi_r|^2}}{\alpha_x^2 + \alpha_y^2}$$

and $$\phi_{xr}\phi_{xr} + \phi_{yr}\phi_{yr} = -a_4(\phi_{xr}^2 + \phi_{yr}^2) + a_5(\phi_{xr}i_{xs}\phi_y i_{ys});$$

updating $\phi_r$ by using the equation calculating the angular velocity of said rotator according to the equation $$P\omega_r = \alpha_x \frac{a_2\alpha_y\phi_r + sgn(\omega_r)\alpha_x \sqrt{\alpha_x^2 + \alpha_y^2 - la_2\phi_r|}}{a_3\phi_r(\alpha_x^2 + \alpha_y^2)} -$$

$$\alpha_y \frac{a_2\alpha_x\phi_r + sgn(\omega_r)\alpha_x \sqrt{\alpha_x^2 + \alpha_y^2 - la_2\phi_r|}}{a_3\phi_r(\alpha_x^2 + \alpha_y^2)}$$

$$= sgn(\omega_r) \frac{1}{a_3\phi_r} \sqrt{\alpha_x^2 + \alpha_y^2 - la_2\phi_r|^2}$$

where P indicates a value of the number of phase divided by two;

calculating a speed control input $u_1$ of said rotator and a magnetic flux control input $u_2$ of said rotator by using the equations $$u_1 = -k_{P1}\omega_r + k_{i1} \int_0^t (\omega_r^* - \omega_r) d\tau$$

and

-continued $$u_2 = -k_{P2}\phi_r + k_{i2} \int_0^t (\phi_r^* - \phi_r) d\tau$$

where $k_{pj}$ and $k_{ij}$ (for j=1, 2) are control gain values for the controller, and $\omega_r^*$ and $\phi_r^*$ are command inputs of $\omega_r$ and $\phi_r$; and substituting the values obtained in the preceding step into the equation $$\begin{bmatrix} i_{xs}^* \\ i_{ys}^* \end{bmatrix} = \begin{bmatrix} -\sin\theta_r & \cos\theta_r \\ \cos\theta_r & \sin\theta_r \end{bmatrix} \begin{bmatrix} 1/\phi_r & 0 \\ 0 & 1 \end{bmatrix} \begin{bmatrix} u_1 \\ u_2 \end{bmatrix}$$

and thereby obtaining current commands $i_{xs}^*$ and $i_{ys}^*$.

2. A vector controller for an induction motor having a rotator and stator, comprising:

rectifying means for obtaining a direct-current voltage from an alternate voltage;

speed controlling means for performing a control operation with a user's speed command $\omega_r^*$ and a speed feedback estimated value $\hat{\omega}_r$, thereby outputting a control output value $u_1$;

magnetic flux controlling means for performing a control operation with a user's magnetic flux command $\phi_r^*$ and a magnetic flux feedback estimated value $\hat{\phi}_r$, thereby outputting a control output value $u_2$;

non-interference controlling means for converting a non-linear interference system into a linear non-interference system, by forming a nonlinear feedback and outputting stator current commands $i_{xs}^*$ and $i_{ys}^*$ on stator fixed coordinates;

current controlling means for performing a proportional integration control with said current commands $i_{xs}^*$ and $i_{ys}^*$ and actual feedback currents $i_{xs}$ and $i_{ys}$ flowing through the induction motor, and converting the result into a voltage signal;

first phase converting means for converting a two-phase voltage of said current controlling means into a three-phase voltage signal;

switching means for driving the induction motor in response to said three-phase voltage signal output from said first phase converting means;

second phase converting means for converting a three-phase current signal from the induction motor into a two-phase current signal; and calculating means for receiving the output signals of said current controlling means and said second phase converting means and calculating a rotator speed and rotator magnetic flux value for the induction motor control.

3. A vector controlling method for an induction motor having a rotator and stator, comprising the steps of:

(a) measuring currents and voltages $i_{xs}$, $i_{ys}$, $V_{xs}$ and $V_{ys}$ for said stator and calculating stator variables $\alpha_x$ and $\alpha_y$;

(b) calculating position angles $\cos\theta_r$ and $\sin\theta_r$ of the magnetic flux of said rotator and the magnitude $\phi_r$ of the magnetic flux of said rotator, thereby estimating rotator magnetic fluxes $\phi_{xr}$ and $\phi_{yr}$ with respect to x-y coordinates;

(c) calculating equations of the rotator magnetic fluxes $\phi_{xr}$ and $\phi_{yr}$ and stator currents $i_{xs}$ and $i_{ys}$ taking fixed coordinates as a reference axis, thereby calculating a rotator angular velocity $P\omega_r$;

(d) controlling an estimated speed value $\hat{\omega}_r$ and estimated magnetic flux value $\hat{\phi}_r$ in accordance with the calculation results of said rotator magnetic fluxes $\phi_{xr}$ and $\phi_{yr}$ and rotator angular velocity $P\omega_r$ by using a speed command $\omega_r^*$ and magnetic flux command $\phi_r^*$, thereby calculating a speed control value $u_1$ for said rotator and a magnetic flux control value $u_2$ for said rotator; and (e) operating said rotator magnetic fluxes $\phi_{xr}$ and $\phi_{yr}$ with respect to said speed control value $u_1$ and magnetic flux control value $u_2$ for said rotator, thereby obtaining stator current command values $i_{xs}^*$ and $i_{ys}^*$.

4. A vector controlling method for an induction motor as claimed in claim 3, wherein, in said (a) step, stator variables $\alpha_x$ and $\alpha_y$ are obtained by the equations $$\alpha_x = \dot{i}_{xs} + a_1 i_{xs} - a_0 V_{xs}$$

and $$\alpha_y = \dot{i}_{ys} + a_1 i_{ys} - a_0 V_{ys}.$$

5. A vector controlling method for an induction motor as claimed in claim 3, wherein, in said (b) step, the equations for estimating $\phi_{xr}$ and $\phi_{yr}$ are $$\cos\theta_r = \frac{a_2 \alpha_x \phi_r - sgn(\omega_r)\alpha_y \sqrt{\alpha_x^2 + \alpha_y^2 - |a_2\phi_r|^2}}{\alpha_x^2 + \alpha_y^2}$$

$$\sin\theta_r = \frac{a_2 \alpha_y \phi_r - sgn(\omega_r)\alpha_x \sqrt{\alpha_x^2 + \alpha_y^2 - |a_2\phi_r|^2}}{\alpha_x^2 + \alpha_y^2}$$

$$\phi_{xr}\phi_{yr} + \phi_{xr}\phi_{yr} = -a_4(\phi^{2xr} + \phi^{2yr}) + a_5(\phi_{xr}i_{xs} + \phi_{yr}i_{ys})$$

and $$\phi_r = -a_4 \phi_r + a_5 \left( \frac{a_2 \alpha_x \phi_r - sgn(\omega_r)\alpha_y \sqrt{\alpha_x^2 + \alpha_y^2 - |a_2\phi_r|^2}}{\alpha_x^2 + \alpha_y^2} \right) i_{xs} +$$

$$= -\left( a_4 + \frac{a_2 a_5 (\alpha_x i_{xs} + \alpha_y i_{ys})}{\alpha_x^2 + \alpha_y^2} \right) \phi_r + sgn(\omega_r) \left( \frac{\alpha_x i_{ys} - \alpha_y i_{xa}}{\alpha_x^2 + \alpha_y^2} \right) \sqrt{\alpha_x^2 + \alpha_y^2 - |a_2 \phi_r|^2} \cdot a_5 \left( \frac{a_2 \alpha_y \phi_r + sgn(\omega_r) \alpha_x \sqrt{\alpha_x^2 + \alpha_y^2 - |a_2 \phi_r|^2}}{\alpha_x^2 + \alpha_y^2} \right).$$

6. A vector controlling method for an induction motor as claimed in claim 3, wherein, in said (c) step, the equation for obtaining said rotator angular velocity $P\omega_r$ is $$P\omega_r = \alpha_x \frac{a_2 \alpha_y \phi_r + sgn(\omega_r) \alpha_x \sqrt{\alpha_x^2 + \alpha_y^2 - |a_2 \phi_r|^2}}{a_3 \phi_r (\alpha_x^2 + \alpha_y^2)} - $$
$$\alpha_y \frac{a_2 \alpha_x \phi_r + sgn(\omega_r) \alpha_x \sqrt{\alpha_x^2 + \alpha_y^2 - |a_2 \phi_r|}}{a_3 \phi_r (\alpha_x^2 + \alpha_y^2)}$$
$$= sgn(\omega_r) \frac{1}{a_3 \phi_r} \sqrt{\alpha_x^2 + \alpha_y^2 - |a_2 \phi_r|^2}$$

where P indicates a value of the number of phase divided by two.

7. A vector controlling method for an induction motor as claimed in claim 3, wherein, in said (d) step, the equations for calculating said speed control value $u_1$ and magnetic flux control value $u_2$ are $$u_1 = -k_{P1}\omega_r + k_{i1} \int_0^t (\omega_r^* - \omega_r) d\tau$$

and $$u_2 = -k_{P2}\phi_r + k_{i2} \int_0^t (\phi_r^* - \phi_r) d\tau$$

where $k_{pj}$ and $k_{ij}$ are control gain values for the controller, and $\omega_r^*$ and $\phi_r^*$ are command inputs of $\omega_r$ and $\phi_r$.

8. A vector controlling method for an induction motor as claimed in claim 3, wherein, in said (e) step, the equation for obtaining stator current commands $i_{xs}^*$ and $i_{yr}^*$ is $$\begin{bmatrix} i_{xs}^* \\ i_{ys}^* \end{bmatrix} = \begin{bmatrix} -\sin\theta_r & \cos\theta_r \\ \cos\theta_r & \sin\theta_r \end{bmatrix} \begin{bmatrix} 1/\phi_r & 0 \\ 0 & 1 \end{bmatrix} \begin{bmatrix} u_1 \\ u_2 \end{bmatrix}.$$

* * * * *